(12) United States Patent
Carle et al.

(10) Patent No.: US 9,776,603 B2
(45) Date of Patent: Oct. 3, 2017

(54) DISC BRAKE SYSTEM FOR A MOTOR VEHICLE, HAVING A BRAKE MECHANISM WITH A REDUCED SIZE

(71) Applicant: VOLVO TRUCK CORPORATION, Göteborg (SE)

(72) Inventors: Jean-Sébastien Carle, Lyons (FR); Nicolas Dessaintjean, Bessenay (FR)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 14/653,980

(22) PCT Filed: Dec. 28, 2012

(86) PCT No.: PCT/IB2012/002971
§ 371 (c)(1),
(2) Date: Jun. 19, 2015

(87) PCT Pub. No.: WO2014/102560
PCT Pub. Date: Jul. 3, 2014

(65) Prior Publication Data
US 2015/0314758 A1 Nov. 5, 2015

(51) Int. Cl.
*B60T 1/06* (2006.01)
*F16D 65/18* (2006.01)
(Continued)

(52) U.S. Cl.
CPC .......... *B60T 1/065* (2013.01); *F16D 55/2255* (2013.01); *F16D 65/18* (2013.01);
(Continued)

(58) Field of Classification Search
CPC ...... B60T 1/065; F16D 55/2255; F16D 65/18; F16D 65/52; F16D 2121/08
(Continued)

(56) References Cited

U.S. PATENT DOCUMENTS

| 3,920,103 A | * | 11/1975 | Haraikawa | F16D 65/18 188/196 D |
| 4,184,571 A | * | 1/1980 | Karasudani | F16D 65/18 188/106 F |
| 5,582,273 A | * | 12/1996 | Baumgartner | F16D 65/18 188/106 F |

FOREIGN PATENT DOCUMENTS

| DE | 195 25 722 A1 | 1/1997 |
| EP | 0 070 106 A1 | 1/1983 |

(Continued)

OTHER PUBLICATIONS

International Search Report (dated Nov. 18, 2013) for corresponding International App. PCT/IB2012/002971.

*Primary Examiner* — Vishal Sahni
(74) *Attorney, Agent, or Firm* — WRB-IP LLP (57) ABSTRACT

A brake system includes a brake disc, rotary movable around a disc axis, and a brake mechanism. The brake mechanism includes a brake pad, movable in a first direction, a cylinder having a piston movable in a second direction, a lever rotary movable around a lever axis, the lever being connected to the piston, a cam element, arranged to convert a rotary motion of the lever around the lever axis, into a translation motion in the first direction, and a rod, expanding between the brake pad and the cam element. The lever, the cam element and the rod are housed in a housing. Considering a plane including the disc axis and the first direction, the lever axis is inclined relative to the plane, at an angle different from 90°.

9 Claims, 5 Drawing Sheets (51) Int. Cl.
  *F16D 55/2255* (2006.01)
  *F16D 65/28* (2006.01)
  *F16D 65/52* (2006.01)
  *F16D 121/08* (2012.01)
  *F16D 125/32* (2012.01)

(52) U.S. Cl.
  CPC ............. *F16D 65/28* (2013.01); *F16D 65/52* (2013.01); *F16D 2121/08* (2013.01); *F16D 2125/32* (2013.01)

(58) Field of Classification Search
  USPC ....................................................... 188/71.8
  See application file for complete search history.

(56) References Cited

FOREIGN PATENT DOCUMENTS

| | | |
|---|---|---|
| EP | 0 265 170 A2 | 4/1988 |
| JP | H11 22762 A | 1/1999 |

* cited by examiner

DISC BRAKE SYSTEM FOR A MOTOR VEHICLE, HAVING A BRAKE MECHANISM WITH A REDUCED SIZE

BACKGROUND AND SUMMARY

The invention relates to a disc brake system for a motor vehicle, having a brake mechanism with a reduced size.

A disc brake system for a motor vehicle is well known from prior art. Such a disc brake system usually comprises:
- a brake disc, rotary movable around a disc axis, intended to be rotary connected with a wheel of the motor vehicle, and
- a brake mechanism, comprising:
  - at least one brake pad, movable in a first direction parallel to the disc axis, between a first position away from the brake disc, and a second position in contact with the brake disc,
  - a cylinder, in particular a pneumatic cylinder, having a rod movable in a second direction, parallel to the first direction,
  - a lever, rotating around a lever axis, the lever being connected to said piston so as to be driven in rotation around the lever axis when the piston is moved,
  - a cam element, arranged to convert a rotary motion of the lever around the lever axis, into a translation motion in the first direction,
  - a piston, expanding between a first end connected to the brake pad and a second end connected to the cam element, so as to transmit a translation motion in the first direction from the cam element to the brake pad, and
  - a housing, at least for the lever, the cam element and the rod. Usually, an adjuster, for compensating a reduction in the thickness of the brake pad in the first direction, is also housed in the housing. Thus, the housing is intended to protect this adjuster, the lever, the cam element and the piston against aggressive particles that would imply corrosion, such as water and/or dust.

The brake pad is intended to be pushed by the piston against the brake disc, so as to apply a braking friction against this brake disc.

To this end, the rod is actuated, so as to push the lever, so that said lever is driven in a rotary motion around the lever axis. The cam element is then moved by the lever in motion, so as to convert the rotary motion of the lever into a translation motion of the piston. Thus, the piston is pushed towards the brake disc, pushing the brake pad against this brake disc.

The brake mechanism generally also comprises at least one resilient element intended to resiliency return the brake pad away from the brake disc when no pushing force is applied by the piston on this brake pad, i.e. when the piston is not actuated.

In such a brake mechanism, the lever axis is perpendicular to a plane comprising the disc axis and the axis of the piston. In other words, when the brake mechanism is mounted vertically above the brake disc, the lever expands in a vertical direction, and the lever axis expands in a horizontal direction.

It should be noticed that the lever needs a sufficient space for allowing a rotary motion of this lever along its stroke. To this end, the housing generally comprises a boss or a specific volume delimiting this space, this boss or specific volume extends radially and outwardly away from the disc axis, i.e. towards the rim of the wheel.

This boss or specific volume is usually in a conflict with the rim of the wheel. As a consequence, the housing has to be deported in a direction parallel to the disc axis, to avoid such a conflict. So, the brake mechanism has to be overdimensioned so as to compensate this deportation. Thus, the size of the brake mechanism is relatively large.

It is desirable to overcome this drawback, by proposing a brake mechanism that is more compact than a previously disclosed brake mechanism from prior art.

To this end, an aspect of the invention relates to a disc brake system for a wheel of a motor vehicle, comprising:
- a brake disc, rotary movable around a disc axis, intended to be rotary connected with said wheel, and
- a brake mechanism, comprising:
  - at least one brake pad having a central pad axis that is parallel to the disc axis and that defines a first direction according to which the brake pad can move between a first position away from the brake disc, and a second position in contact with the brake disc,
  - a cylinder, in particular a pneumatic cylinder, having a rod movable in a second direction,
  - a lever, rotatory movable around a lever axis, the lever having a lever end that is connected to said rod such that the lever is driven in a rotary motion around the lever axis when the rod is moved in the second direction,
  - a cam element, arranged to convert the rotary motion of the lever around the lever axis, into a translation motion in the first direction,
  - at least one piston, expanding between a first end connected to the brake pad and a second end connected to the cam element, so as to transmit a translation motion in the first direction from the cam element to the brake pad, and
  - a housing, at least for the lever, the cam element and the piston, characterized in that, considering a plane comprising the disc axis and the first the central pad axis, the lever axis is inclined relative to said plane, at an angle different from 90°.

Throughout this patent application, the term "central pad axis" refers to the axis of the brake pad that is parallel to the disc axis and that is passing through the centre of gravity of the brake pad. When the brake mechanism comprises only one piston, the central pad axis is preferably merged with the main axis of the piston.

By inclining the lever axis at an angle different from 90° relative to said plane, the lever stroke is lowered in a radial direction from the disc axis, so that the boss or the specific volume in the part of the housing that is furthest from the disc axis can be reduced. Thus, the housing of the invention can be made more compact than a housing from prior art, so that this housing can be arranged in a whole or almost in a whole inside the rim of the wheel. Thus, this housing allows more free space for other components that are disposed around the brake system, such as suspension, wheel axles, chassis, etc.

It should be noticed that the invention reduce the size of the brake mechanism, without changing the moment arm of the lever.

The term "part of the housing that is furthest from the disc axis" refers to the part of the housing that is radially furthest from the disc axis and therefore that is radially closest to the rim of the wheel.

A brake mechanism according to the invention can further comprise one or several of the following features, alone or in combination:

The lever axis is inclined relative to the plane, at an angle between −35 and 55°.

The lever axis is preferably inclined relative to the plane at an angle between 10 and 55° such that the end of the lever that is confected by said rod is located in the half part of the housing that is furthest from the disc axis. To be more precise "the half part of the housing that is furthest from the disc axis" refers to the inside part of the housing that extends between the wall of the housing that is furthest from the disc axis and a median line that extends between the wall of the housing that is furthest from the disc axis and the wall of the housing that is closest to the disc axis.

The lever axis is inclined relative to the plane (P) at an angle of 30°.

The lever expands in a direction that is perpendicular to the lever axis.

The lever is inclined between 0 and 45° with respect to a direction that is perpendicular to the lever axis.

Said plane is vertical when the brake mechanism is mounted on a disc brake system.

The cam element is a cylinder having an outer surface comprising at least a rounded part around a cam axis, said cam axis is parallel to the lever axis and it is different from this lever axis, the cam element is rotary movable around the lever axis, and the second end of the piston is arranged in contact with the rounded part of the cam element.

The lever is integral with the cam element.

The disc brake system also comprises an adjuster, for compensating a reduction in the thickness of the brake pad in the first direction, said adjuster being housed in said housing.

These and other aspects and advantages will become apparent upon reading the following description in view of the drawing attached hereto representing, as non-limiting examples, embodiments of a vehicle according to the invention.

BRIEF DESCRIPTION OF THE DRAWINGS

The following detailed description of several embodiments of the invention is better understood when read in conjunction with the appended drawings, it being however understood that the invention is not limited to the specific embodiments disclosed.

FIGS. 6.a and 6.b are front views representing the lever of FIG. 2 in two extreme angular positions according to a preferred embodiment;

FIGS. 7.a and 7.b are front views representing the lever of FIG. 2 in two extreme angular positions according to another preferred embodiment.

DETAILED DESCRIPTION

Figure 1:
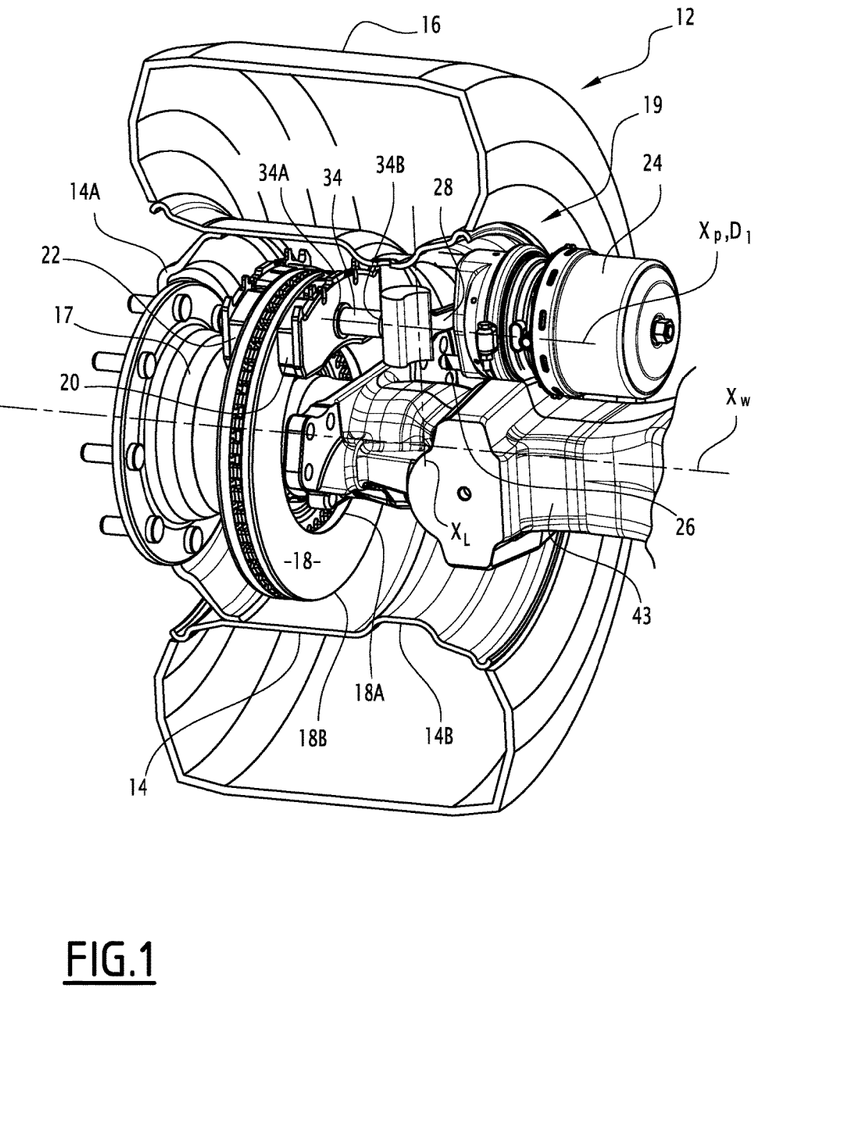
FIG. 1 is a perspective view of a partially shown disc brake system according to a first example of embodiment of the invention, arranged in a wheel of a motor vehicle.
Figure 2:
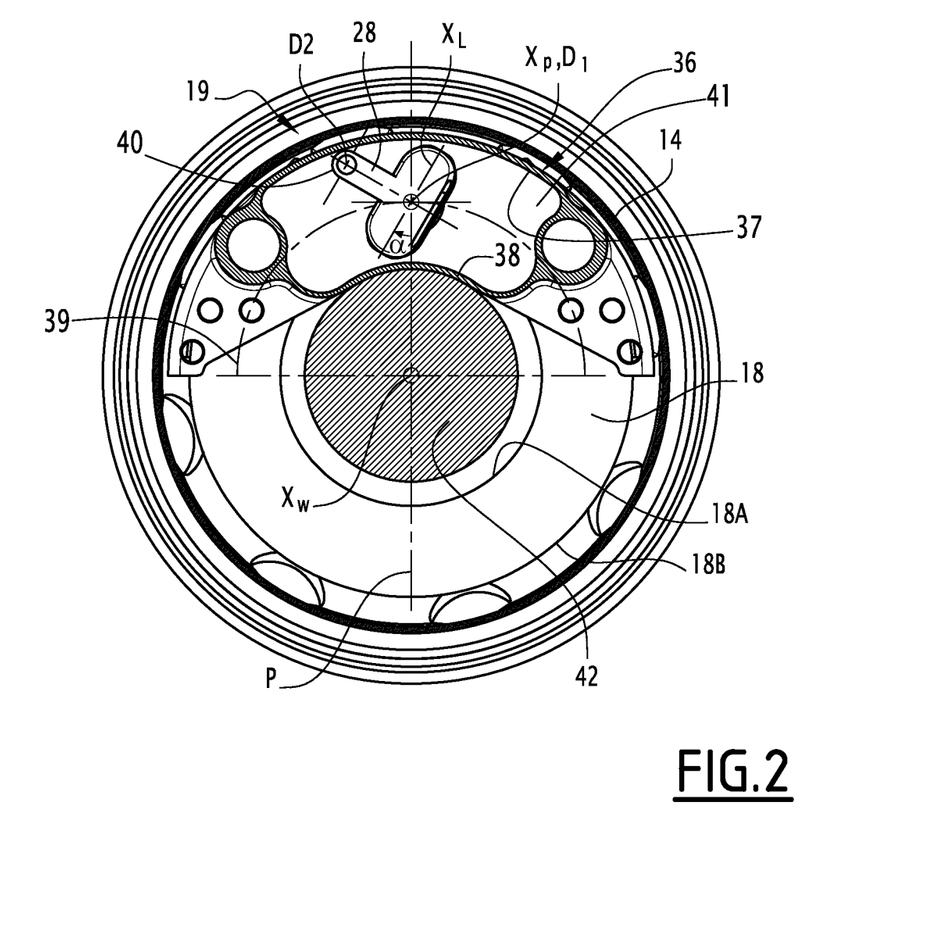
FIG. 2 is a front view of a disc brake system according to an aspect of the present invention.
Figure 3:
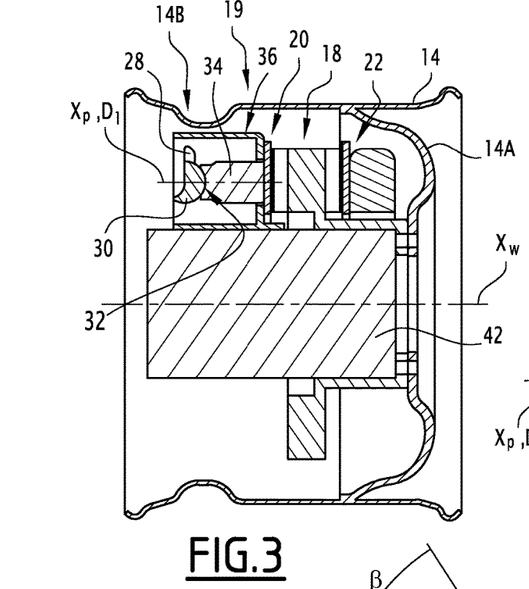
FIG. 3 is an axial profile of the disc brake system of FIG. 1.

With reference to FIG. 1 to 3, we describe a disc brake system 10 intended to be arranged on a wheel 12 of a motor vehicle. It will be appreciated that FIG. 2 is not necessarily consistent in all ways with FIGS. 1 and 3.

The wheel 12 is standard, and it comprises a rim 14 having a revolution form around a wheel axis Xw. The wheel 12 also comprises a tire 16, arranged on the rim 14, coaxially to this rim 14. When the axle 43 is a driving axle, the wheel 12 is mounted on the drive shaft 17 expanding along the wheel axis Xw. To this end, a part 14A of the rim 14 is fastened to the drive shaft 17. It is noticed that the disc brake system 10 according to the invention can also be mounted on an axle that is also a steering axle or that is not a driving axle, for instance, a steering axle where the wheel is connected to the steering axle via a knuckle not represented).

The disc brake system 10 comprises a brake disc 18, rotary fastened to the wheel 12 or to the drive shaft 17 when it is considered a driving axle.

It should be noticed that the brake disc 18 has an annular shape around a disc axis. In particular, the brake disc 18 radially expands between an inner edge 18A and an outer edge 18B. The disc axis is merged with the wheel axis Xw, so it will be also referred Xw.

Besides, the disc brake system 10 comprises a brake mechanism 19, intended to cooperate with the brake disc 18. In particular, the disc brake system 10 comprises at least one brake pad 20 having a central pad axis XP that is parallel to the disc axis (Xw) and that defines a first direction D1 according to which the brake pad can move between a first position away from the brake disc 18, and a second position in contact with the brake disc 18.

The brake mechanism 19 generally comprises another brake pad 22, arranged on the other side of the brake disc 18. When the brake mechanism is equipped with two opposite brake pads 20, 22, the brake pads 20, 22 are mounted on a calliper, so that, when the brake pad 20 is in its second position, the brake disc 18 is pinched between the brake pad 20 and the other brake pad 22. It should be noticed that each brake pad 20, 22 is rotary motionless. Thus, the brake disc 18 in rotation is slowed down when pinched between the brake pads 20, 22.

As usual, each brake pad 20, 22 is provided with a friction lining for a friction against the brake disc 18 when pinched. Because of wear, the thickness of the friction lining is reduced during his life time. Thus, the brake mechanism 19 comprises an adjuster (not shown) for compensating a reduction in the thickness of this friction lining.

Besides, the brake mechanism 19 comprises a cylinder 24, in particular a pneumatic cylinder, having a rod movable in a second direction D2, parallel or substantially parallel to the first direction D1. This rod is intended to provide a pushing force that is intended to be transmitted to the brake pad 20 through force transmission means 26.

The force transmission means 26 comprise a lever 28, rotary movable around a lever axis XL. In this first embodiment, the lever 28 expands in a direction that is perpendicular to the lever axis XL.

The lever 28 is connected to said rod via its lever end 40, so as to be driven in rotation around the lever axis XL when the rod is moved in the second direction D2.

The force transmission means 26 also comprise a cam element 30, arranged to convert a rotary motion of the lever 28 around the lever axis XL, into a translation motion in the first direction D1. Thus, the cam element 30 is rotary connected to the lever 28 around the lever axis XL.

Figure 4:
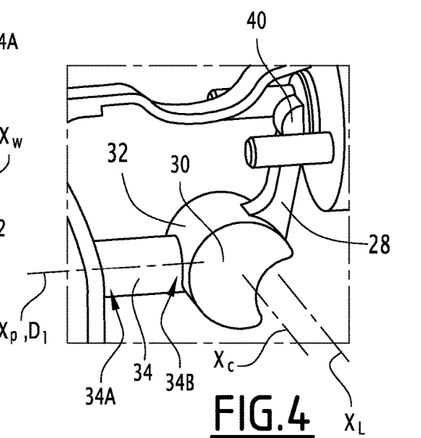
FIG. 4 is a perspective view of a lever of force transmission means of the disc brake system of FIG. 1.

An example of cam element 30 is more precisely shown on FIG. 4. As shown on this FIG. 4, the cam element 30 is a cylinder having an outer surface comprising at least a rounded part 32 around a cam axis Xc. This cam axis Xc is parallel to the lever axis XL, and it is different from this lever axis XL. Besides, the cam element 30 is rotary movable around the lever axis XL. Thus, this cam element 30 forms an eccentric shape regarding the lever axis XL, so that the position of the cam element 30 in the first direction D1 changes when it turns around the lever axis XL.

Preferably, the lever 28 is integral with the cam element 30.

The brake mechanism 19 also comprises a piston 34, expanding in the first direction D1 between a first end 34A connected to the brake pad 20 and a second end 34B connected to the cam element 30, so as to transmit a translation motion in the first direction D1 from the cam element 30 to the brake pad 20. More particularly, the second end 34B of the piston 34 is arranged in contact with the rounded part 32 of the cam element 30. In order to have an optimized efficiency, the piston 34 is directed toward a central line between the inner edge 18A and the outer edge 18B of the brake disc 18. The brake mechanism 19 may also comprises two pistons instead of one.

When the brake mechanism comprises only one piston 34, the central pad axis XP is preferably merged with the main axis of the piston 34 such as depicted on FIGS. 1, 2 and 3.

Figure 5:
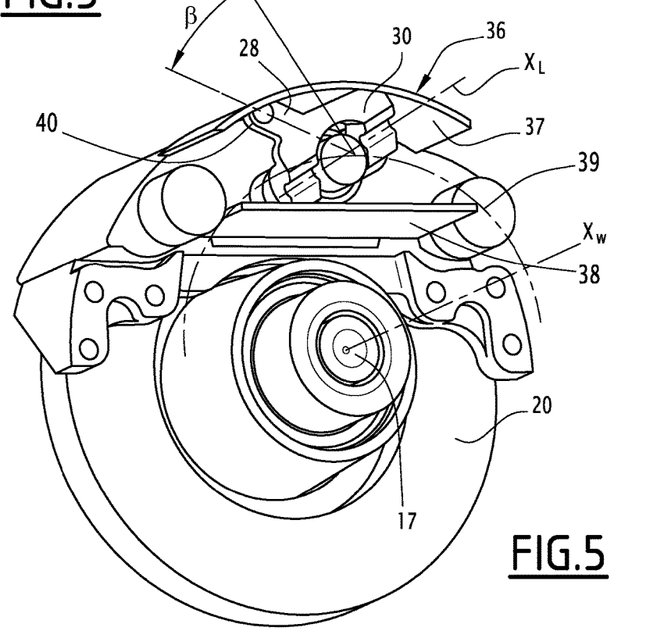
FIG. 5 is a perspective view of a disc brake system according to a second example of embodiment of the invention.

It should be noticed that the disc brake system 10 comprises a housing 36, shown on FIGS. 2, 3 and 5, at least for housing the force transmission means 26 (i.e. the lever 28, the cam element 30 and the piston 34), and may also comprise the adjuster. For the sake of clarity the housing is not represented on FIGS. 1 and 4.

The housing 36 can be delimited by at least a first wall 37 that is radially further from the disc axis Xw and a second wall 38 of the housing that is radially closer to the disc axis Xw.

The cylinder 24 is preferably fastened to this housing 36, with a seal arranged between this cylinder 24 and this housing 36.

In the following disclosure, we consider a plane P, comprising the disc axis Xw and the central pad axis XP. This plane P is shown on FIG. 2, and this plane P is the cut plane in which FIG. 3 is drawn, however, it will be appreciated that FIG. 2 is not necessarily consistent in all ways with FIGS. 1 and 3. In the disclosed example, the plane P vertical but is could also be oriented in any other direction, for instance, horizontally depending on the global orientation of the the the disc brake system 10 around the wheel axis Xw.

When the brake mechanism comprises only one piston 34, the plane P can also be defined as a plane comprising the disc axis Xw and the the main axis of the piston 34.

The lever axis XL is inclined relative to said plane P, at an angle a different from 90°. In other words, when the disc brake system 10 is arranged above the wheel axis Xw, the lever 28 expands in a direction that is not vertical.

Thus, comparing with a disc brake system from prior art, wherein the lever expands in a vertical direction, the lever stroke in the invention is lowered in the vertical direction. So, the housing 36 can still comprise a boss or a specific volume extending radially and outwardly away from the disc axis Xw, in order to allow the lever stroke, but thanks to the invention it is reduced with regard to a boss or specific volume of a housing from prior art.

Indeed, referring to FIG. 3, it can be seen that a usual rim 14 comprises a part 14B with a lower diameter. Because of this part 14B, the lever of a disc brake system from the prior art has to be deported in the first direction, because said boss or specific housing of the housing would be in a radial conflict with this part 14B.

In FIGS. 2 and 3, for the sake of clarity, the hatched zone 42 represents a global volume occupied by the shaft, the hub that is connected to the wheel and the axle when the disc brake mechanism is for instance mounted on a drive axle.

Since the invention allows reducing, or suppressing, the boss or the specific volume, it is possible to arrange the lever 28 under the part 14B of the rim 14, as shown in FIG. 3, instead of deporting it in the first direction D1.

Figure 6A:
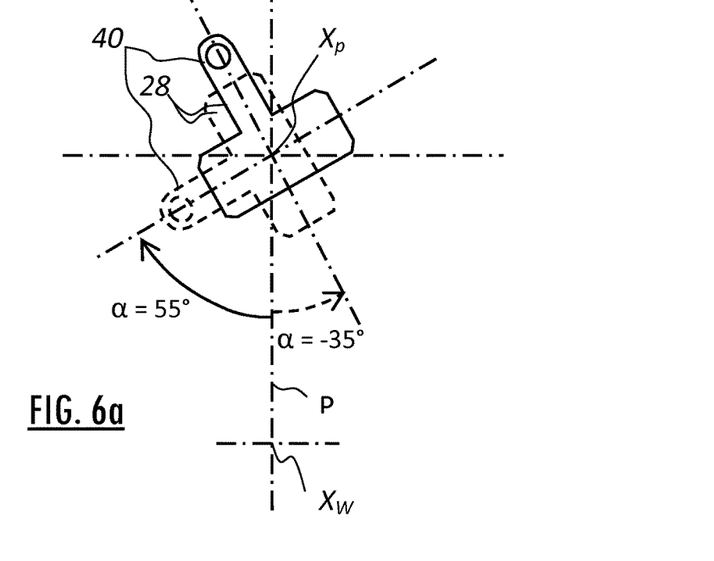
Figure 6B:
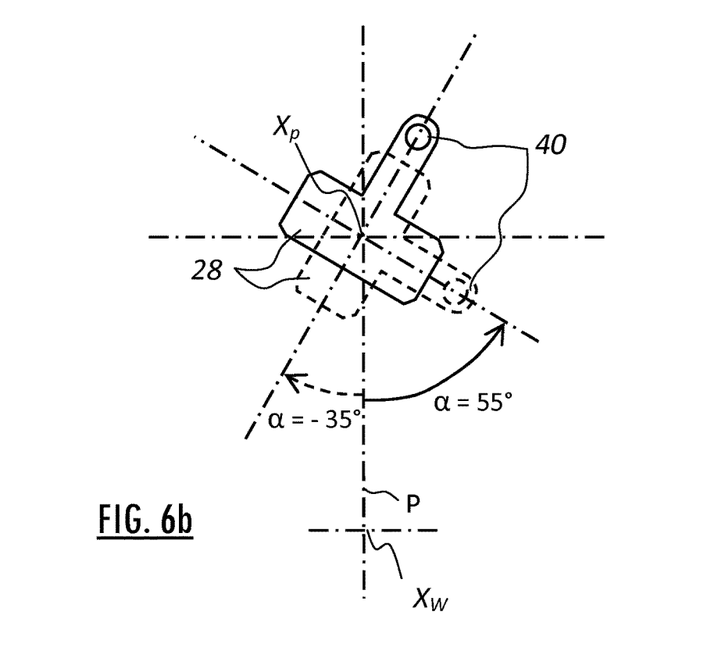

Preferentially and such as represented in FIGS. 6.a and 6b, the angle is between −35° and 55°. Indeed, if the angles is superior to 55°, said boss in the housing 36 is considered as not sufficiently reduced. Beside, if the angle is inferior to −35°, the cylinder 24, that is arranged aligned with the lever 28 in the second direction D2, may be in conflict with other components that are disposed around the brake system 10.

Figure 7A:
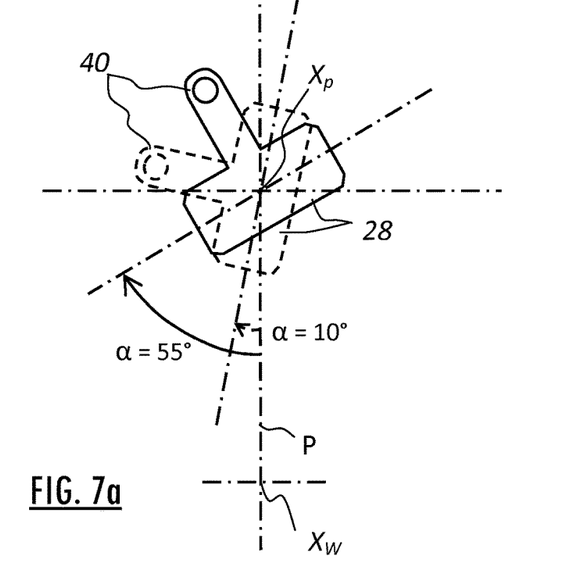
Figure 7B:
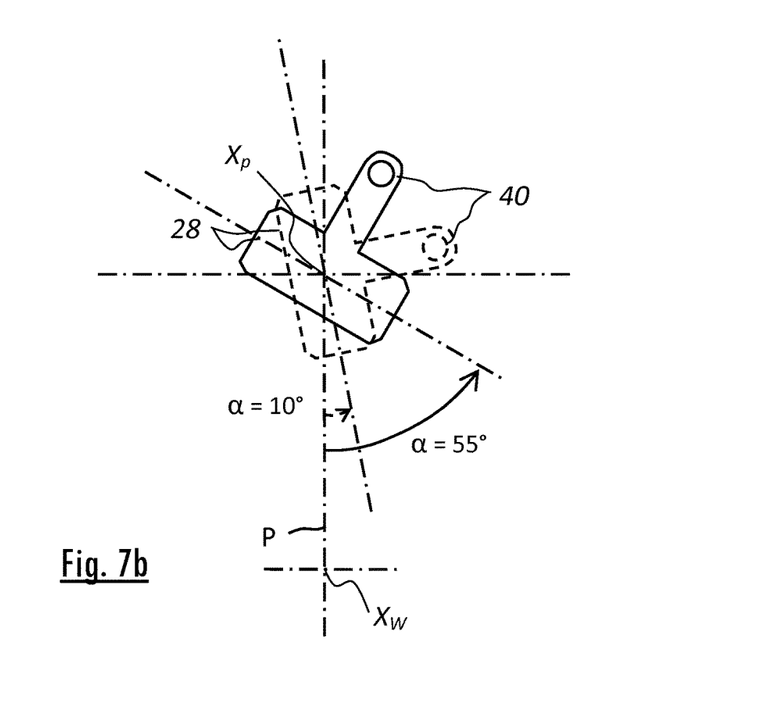

More preferably and such as represented in FIGS. 7.a and 7.b, the angle is comprised between 10° and 55°. In this range of valies the lever end 40 is located in the half part 41 of the housing 36 that is furthest from the disc axis Xw (FIGS. 2 and 5).

To be more precise "the half part of the housing that is furthest from the disc axis" refers to the inside part 41 of the housing that extends between the first wall 37 and a median line 39 that extends between the first wall 37 and the second wall 38 and having, for instance, the form of an arc of circle centred on the disc axis Xw. Thanks to that, the location of the cylinder 24 has a low impact on the accessibility of the different fastening means of the disc brake system 10. For instance, screw and bolt assemblies (not represented) used to secure the brake mechanism 19 on the axle 43 or on a knuckle of the vehicle are therefore easy to access, so that the brake mechanism 19 can be easily assembled or disassembled from the axle 43 or from a knuckle when it is considered a steering axle.

It should be noticed that an optimal angle a is equal to 30°. Indeed, as shown on FIG. 2, the housing 36 does not need a boss for housing the lever stroke if the angle <<=30°. More particularly, the size of the brake mechanism 19 is optimized for such an angle <<=30°.

A second embodiment of the invention is now disclosed in reference to FIG. 5. On this FIG. 5, elements similar to those previously disclosed have a same reference.

According to this second embodiment, the lever axis XL is inclined relative to the plan P at an angle about 50° and the lever 28 extends in a direction that is not perpendicular to the lever axis XL. To be more precise the lever 28 is inclined at an angle β that is about 25° with respect to a direction that is perpendicular to the lever axis XL Thus, it is possible to reduce the size of the housing 36 by inclining the lever 28 with regards to a direction perpendicular to the lever axis XL. To reduce the size of the housing 36 and according to the invention, different angles can be considered so that, when the lever axis XL is inclined relative to said plane P at an angle different from 90° and preferably comprised between −35° and 55°, the angle β can be comprised between 0 and 45° with respect to a direction titans perpendicular to the lever axis XL.

It should be noticed that the invention is not limited to the previously disclosed embodiments, but it can contain additional features or variants.

The invention claimed is:
1. A disc brake system for a wheel of a motor vehicle, comprising:
   a brake disc, rotary movable around a disc axis, intended to be rotary connected with the wheel, and
   a brake mechanism, comprising:

at least one brake pad having a central pad axis that is parallel to the disc axis and that defines a first direction according to which the brake pad can move between a first position away from the brake disc, and a second position in contact with the brake disc, a pneumatic cylinder, a lever, rotary movable around a lever axis, the lever having a lever end that can be driven in rotation around the lever axis, a cam element, arranged to convert a rotary motion of the lever around the lever axis, into a translation motion in the first direction, at least one piston, expanding between a first end connected to the brake pad and a second end connected to the cam element, so as to transmit a translation motion in the first direction from the cam element to the brake pad, and a housing, at least for to lever, the cam element and the piston, wherein, considering a plane defined by the disc axis and the central pad axis, the lever axis is inclined relative to the plane, at an angle different from 90°, wherein the lever is inclined at an angle between 0 and 45° with respect to a direction that is perpendicular to the lever axis.

2. The disc brake system according to claim 1, wherein the lever axis is inclined relative to the plane at an angle between −35° and 55°.

3. The disc brake system according to claim 2, wherein the lever axis is inclined relative to the plane at an angle between 10 and 55° such that the end of the lever opposite to the lever axis is located in the half part of the housing that is furthest from the disc axis.

4. The disc brake system according to claim 3, wherein the lever axis is inclined relative to the plane at an angle of 30°.

5. The disc brake system according to claim 1, wherein the lever expands in a direction that is perpendicular to the lever axis.

6. The disc brake system according to claim 1, wherein the plane is vertical.

7. The disc brake system according to claim 1, wherein:
the cam element is a cylinder having an outer surface comprising at least a rounded part around a cam axis,
the cam axis is parallel to the lever axis and it is different from this lever axis,
the cam element is rotary movable around the lever axis, and
the second end of the piston is arranged in contact with the rounded part of the cam element.

8. The disc brake system according to claim 7, wherein the lever is integral with the cam element.

9. The disc brake system according to claim 1, comprising an adjuster, for compensating a reduction in the thickness of the brake pad in the first direction, the adjuster being housed in the housing.

* * * * *